(12) United States Patent
Harada et al.

(10) Patent No.: US 6,549,830 B2
(45) Date of Patent: Apr. 15, 2003

(54) APPARATUS FOR CONTROLLING WATERCRAFT PILOT CONTROL

(75) Inventors: Hiroshi Harada, Shizuoka (JP); Yukio Matsushita, Shizuoka (JP); Hirotaka Kaji, Shizuoka (JP); Masashi Yamaguchi, Shizuoka (JP)

(73) Assignees: Sanshin Kogyo Kabushki Kaisha, Hamamatsu (JP); Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/728,923

(22) Filed: Dec. 1, 2000

(65) Prior Publication Data

US 2001/0051476 A1 Dec. 13, 2001

(30) Foreign Application Priority Data

Dec. 1, 1999 (JP) .............................. 11-342331

(51) Int. Cl.[7] .......................... B63H 21/21; G06F 19/00
(52) U.S. Cl. ............................ 701/21; 701/27; 706/16
(58) Field of Search ............................. 701/21, 23, 27, 701/36; 440/84; 706/2, 3, 4, 5, 16, 19, 23, 905

(56) References Cited

U.S. PATENT DOCUMENTS

| | | | | |
|---|---|---|---|---|
| 4,785,404 A | | 11/1988 | Sims et al. ................. | 701/200 |
| 4,931,025 A | | 6/1990 | Torigai et al. ................ | 440/1 |
| 5,006,992 A | | 4/1991 | Skeirik ....................... | 706/58 |
| 5,263,432 A | | 11/1993 | Davis ......................... | 114/286 |
| 5,465,204 A | | 11/1995 | Sekine et al. ................ | 700/32 |
| 5,630,395 A | * | 5/1997 | Katoh et al. ................. | 123/406 |
| 5,683,275 A | | 11/1997 | Nanami ....................... | 440/38 |
| 5,813,390 A | | 9/1998 | Anamoto ...................... | 123/674 |
| 5,857,321 A | * | 1/1999 | Rajamani et al. ............. | 60/39.27 |
| 6,116,228 A | * | 9/2000 | Motose et al. ................ | 123/679 |
| 6,152,102 A | * | 11/2000 | Ruman ......................... | 123/295 |
| 6,220,904 B1 | * | 4/2001 | Hoshiba et al. ............... | 440/1 |
| 6,314,412 B1 | * | 11/2001 | Yamaguchi et al. ............ | 706/13 |

FOREIGN PATENT DOCUMENTS

| | | |
|---|---|---|
| EP | 0 957 416 A1 | 11/1999 |
| EP | 1 107 078 A1 | 6/2001 |
| WO | WO 98/37465 | 8/1998 |
| WO | WO 98/50831 | 11/1998 |

OTHER PUBLICATIONS

U.S. patent application Ser. No. 09/661,768, Hirotaka Kaji, et al., filed Sep. 14, 2000.

D.D. Siljak, et al., On Hierarchic Optimal Control of Large–Scale Systems, 8th Asilomar Conference on Circuits, Systems and computers, Dec. 3, 1974, pp. 495–502.

T. Sadeghi, et al. Computer–Aided Design of Control Systems via Parameter Optimization Method (CADCS/POM): an Interactive Graphics Approach, Proceedings of the 1984 Americal Control Conference, Jun. 6, 1984, pp. 1634–1640.

* cited by examiner

*Primary Examiner*—Tan Q. Nguyen
(74) *Attorney, Agent, or Firm*—Knobbe, Martens, Olson & Bear LLP

(57) ABSTRACT

The invention provides a pilot control device that enables optimum pilot depending on user's preference and use environment. The pilot control device includes a control module and an optimum process device, with regard to a watercraft having an apparatus affecting pilot control. The control module determines output regarding a manipulated variable of the device affecting pilot control based on predetermined input information. The optimum process device optimizes, in real time, the control module, with the characteristics of a watercraft as an evaluation subject.

20 Claims, 19 Drawing Sheets

FIG. 7

Fuzzy rule table

| | FAST | MID | SLOW |
|---|---|---|---|
| PL | -10° | -5° | -1° |
| PS | -5° | -1° | 0° |
| ZR | -1° | 0° ① | +1° ③ |
| NS | 0° | +1° ② | +5° ④ |
| NL | +1° | +5° | +10° |

Speed → (columns), Acceleration ↓ (rows)

input: Speed, Acceleration
output: Electronic throttle valve opening variable

Extraction →

| ① | ② | ③ | ④ |
|---|---|---|---|
| 0° | +1° | +1° | +5° |

Perturbation with normalized random numbers added →

| +0.5° | +1.3° | +0.4° | +6.1° |
| -0.3° | +1.4° | +2.0° | +4.9° |
| +0.9° | +0.6° | +1.5° | +5.2° |

Fitness table

| Acceleration \ Speed | FAST | MID | SLOW |
|---|---|---|---|
| PL | | | |
| PS | | 0.42 | 0.28 |
| ZR | | 0.18 | 0.12 |
| NS | | | |
| NL | | | |

Add ↓

Total table

| Acceleration \ Speed | FAST | MID | SLOW |
|---|---|---|---|
| PL | 0.02 | 1.87 | 0.27 |
| PS | 4.96 | 8.39 | 3.72 |
| ZR | 12.61 | ① 86.42 | ③ 35.48 |
| NS | 9.55 | ② 49.75 | ④ 22.37 |
| NL | 8.96 | 18.19 | 2.44 |

Evolutionary computation module (GA)

Evolutionary computation module (ES)

APPARATUS FOR CONTROLLING WATERCRAFT PILOT CONTROL

BACKGROUND OF THE INVENTION

1. Field of the Invention

The present invention relates to a watercraft pilot control device that enables optimum pilot control according to a user's preference or its environment of use. The present invention can also be adapted to other machine operation.

2. Description of the Related Art

An outboard motor mounted at the backside of a hull has made trial runs before shipment in the past, and then characteristics of an engine and a trim apparatus in the outboard motor are set.

However, generally, use environments of a watercraft vary remarkably because of changes in weathers or seasons. Since users' preference varies greatly, it is difficult to set an engine and a trim apparatus in an outboard motor so that the pilot characteristics can be obtained that satisfy all users under every use environment.

For this reason, the situation at the time of setting is different from that at the time of loading in making use of a watercraft. When the watercraft receives disturbances such as waves, there is a big difference in environments at the time of between the setting and the use. Accordingly, it cannot necessarily be said that the characteristics set at the stage of trial runs are optimal. There may a case where a user feels uncomfortable.

SUMMARY OF THE INVENTION

The problem is not limited to the type of watercraft having an outboard motor, but is applicable to other types of watercraft having a motor and a movable flap apparatus. One of the embodiments in accordance with the invention is, as one of its objects, to solve the problem and provide a pilot control device that enables optimum pilot according to users' preference or use environment.

One aspect of the invention involves a pilot control device provided in a watercraft including a device affecting pilot control. The pilot control device comprises a control module for determining an output regarding a manipulated variable for the apparatus based on predetermined input information, and an optimization process device for, in real time, optimizing the control module with a characteristic of the watercraft as an evaluation subject.

The present invention can be adapted to not only a watercraft but also other machines including vehicles, motorcycles, industrial robots, etc. The present invention includes a method for optimizing in real-time operation of a machine manipulated by a user, operation of which machine is divided into plural modes regulated by different control parameters. The machine is operated by plural control modules corresponding to said plural modes, and the method comprises the steps of: (a) operating the machine in a mode using the control module for the mode; (b) optimizing in real-time the input-output relationship of the control module by coding parameters regulating the control module into chromosomes, said chromosomes being subjected to evolutionary computation, wherein at least one fitted individual is selected based on the user's ultimate choice or a preselected target; (c) operating the machine using the optimized control module; and (d) operating the machine in another mode using the control module for the mode, and repeating steps (b) and (c).

In the above, the plural modes may include at least two modes, one being regulated by a larger number of parameters than is the other.

Preferably, the control module regulated by a larger number of parameters may be provided with a fuzzy inference system comprising a matrix of fuzzy rules which are regulated by preselected parameters, and the optimization step is conducted by at least one of the following: (i) revising the fuzzy rule matrix by extracting a section from the matrix and coding elements of the section into chromosomes; (ii) modifying the configuration of the fuzzy rule matrix defined by membership functions by coding elements of the membership functions into chromosomes; or (iii) changing a level of an input of the parameters and a level of an output of the fuzzy inference system by coding elements of the levels into chromosomes.

In the above, the method can further comprise monitoring the fuzzy rule matrix in use while operating the machine, and evaluating the section extracted in (ii) or the membership functions to be modified in (iii).

In the above, in one embodiment, the machine is provide in a watercraft, for pilot control. Further, the machine may include at least either a trim apparatus or an electronic throttle.

In application to a watercraft, the plural operation modes may include a general pilot mode, an acceleration mode, and a cruise mode. Further, the control module for the acceleration mode may control the trim apparatus and may be regulated by parameters including a trim-out initiation speed, a trim operation speed, and a final trim angle. Preferably, the control module for the general pilot mode controls the trim apparatus and the electronic throttle and is provided with a fuzzy inference system described above.

In operation of a watercraft, pilot control is more complicated than driving control of a car because water resistance non-linearly increases as the speed of the watercraft increases. The relationship between the engine r.p.m. and the velocity of the watercraft is not constant. Further, unlike operation of a car, watercraft pilot control is regulated by a trim angle and the timing of activating a trim apparatus. Pilot control is also influenced by the number of people on board or loaded goods. Since pilot control involves complicated factors, fuzzy inference control is effective. On the other hand, unlike operation of a car, there is no fixed road or obstacle, and thus, acceleration control or cruise control can be conducted easily, by operating a trim apparatus.

In the above, general pilot control, acceleration control, and cruise control, for example, are regulated by different control parameters. If one control module is used for controlling plural modes, evolutionary computation will be very complicated, and it will require significant time to optimize the system. By using plural control modules corresponding to plural modes, the optimization process can be conducted effectively in a short time period.

BRIEF DESCRIPTION OF THE DRAWINGS

FIG. 7 illustrates relationship between a fuzzy control table of a boat operation fuzzy control module and individuals produced by encoding part of it.

FIG. 11 illustrates one example of seeking a total of fitness of fuzzy rules.

DETAILED DESCRIPTION OF THE PREFERRED EMBODIMENT

Some embodiments of a pilot control in accordance with the invention will be explained, referring to the figures below.

Figure 1A:
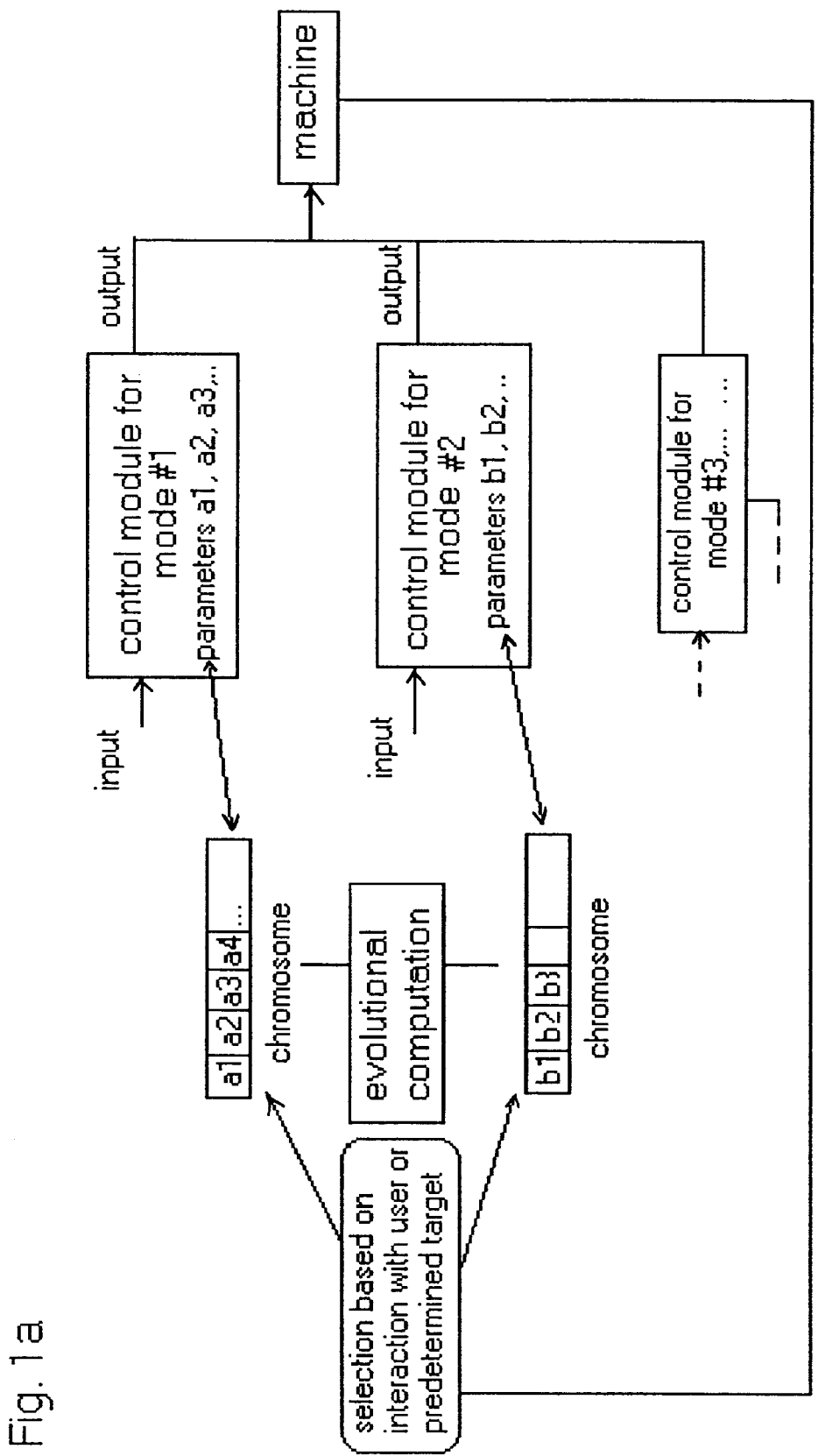
FIG. 1a is a schematic diagram illustrating one embodiment of the present invention using plural control modules corresponding to plural operation modes.

FIG. 1a is a schematic diagram illustrating one embodiment of the present invention using plural control modules corresponding to plural operation modes. FIG. 1a shows a method for optimizing in real-time operation of a machine manipulated by a user, operation of which machine is divided into plural modes (#1, #2, ... ) regulated by different control parameters (a1, a2, a3, ... ; b1, b2, ... ) ("different" means "non-identical" and does not exclude common parameters). The machine is operated by plural control modules corresponding to said plural modes. The method comprises the steps of: (a) operating the machine in a mode using the control module for the mode; (b) optimizing in real-time the input-output relationship of the control module by coding parameters regulating the control module into chromosomes, said chromosomes being subjected to evolutionary computation, wherein at least one fitted individual is selected based on the user's ultimate choice or a preselected target; (c) operating the machine using the optimized control module; and (d) operating the machine in another mode using the control module for the mode, and repeating steps (b) and (c). In the above, the control parameters regulate the input-output relationship of the control modules. However, the parameters can be input itself.

Figure 1B:
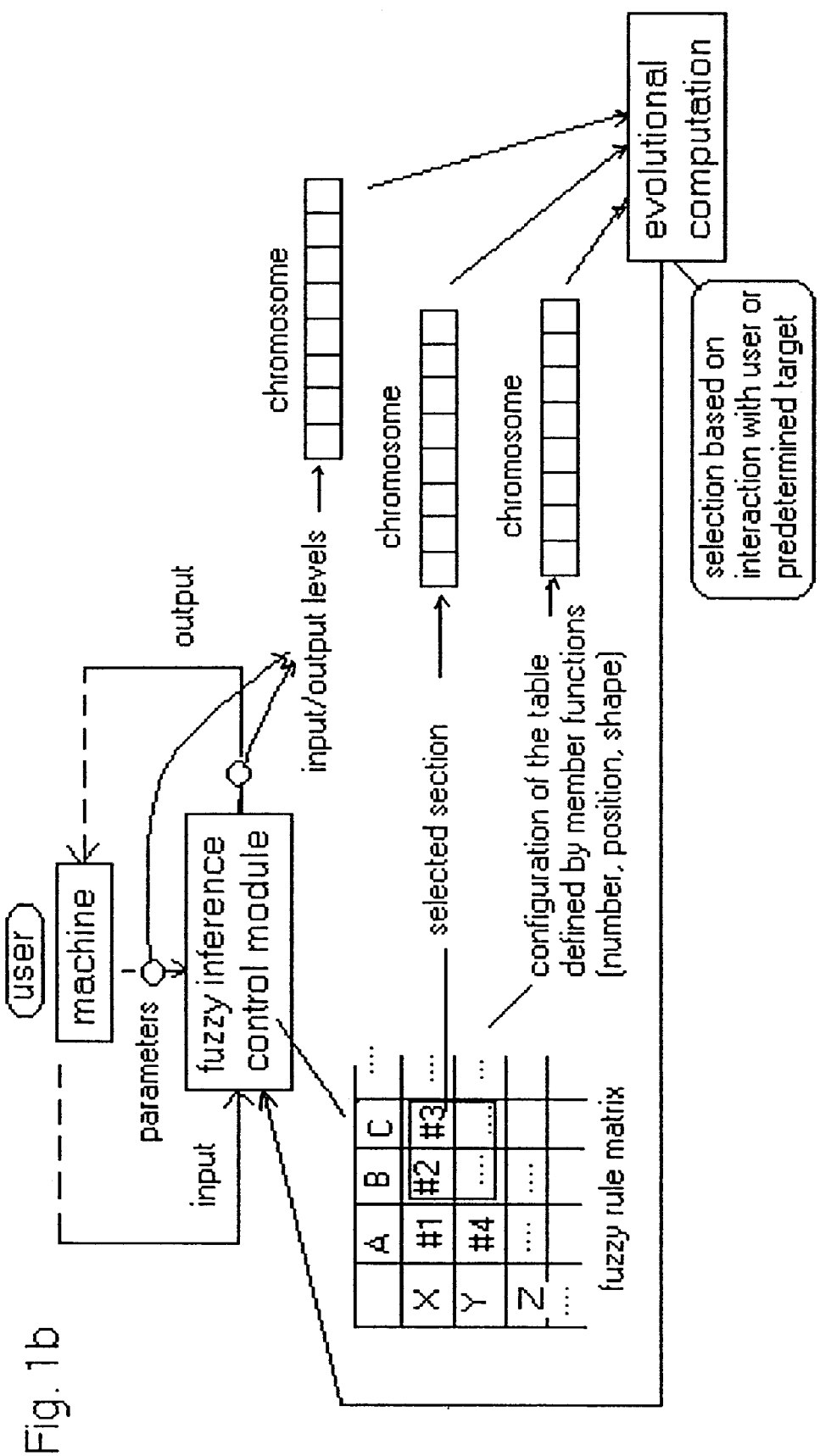
FIG. 1b is a schematic diagram illustrating one embodiment of a fuzzy inference control module.

FIG. 1b is a schematic diagram illustrating one embodiment of a fuzzy inference control module. At least one of the control modules shown in FIG. 1a may be a fuzzy inference system shown in FIG. 1b comprising a matrix of fuzzy rules which are regulated by preselected parameters, and the optimization step is conducted by at least one of the following: (i) revising the fuzzy rule matrix by extracting a section from the matrix and coding elements of the section into chromosomes; (ii) modifying the configuration of the fuzzy rule matrix defined by membership functions by coding elements of the membership functions into chromosomes; or (iii) changing a level of an input of the parameters and a level of an output of the fuzzy inference system by coding elements of the levels into chromosomes. In the above, the parameters may be (i) the number, shape, position and/or expanse of membership functions for the fuzzy inference system of the control device, (ii) fuzzy rules, or (iii) standardized coefficients for input and output values.

The fuzzy rules can be compiled in the form of a fuzzy rule matrix. The configuration of the matrix may be defined by membership functions. Each section of the matrix represents a fuzzy rule which is a parameter having a value. The type of parameter and a value of the parameter are referred to as "a parameter".

Coding into chromosomes can be made on all of the parameters or part thereof selected for the fuzzy controller.

Figure 2:
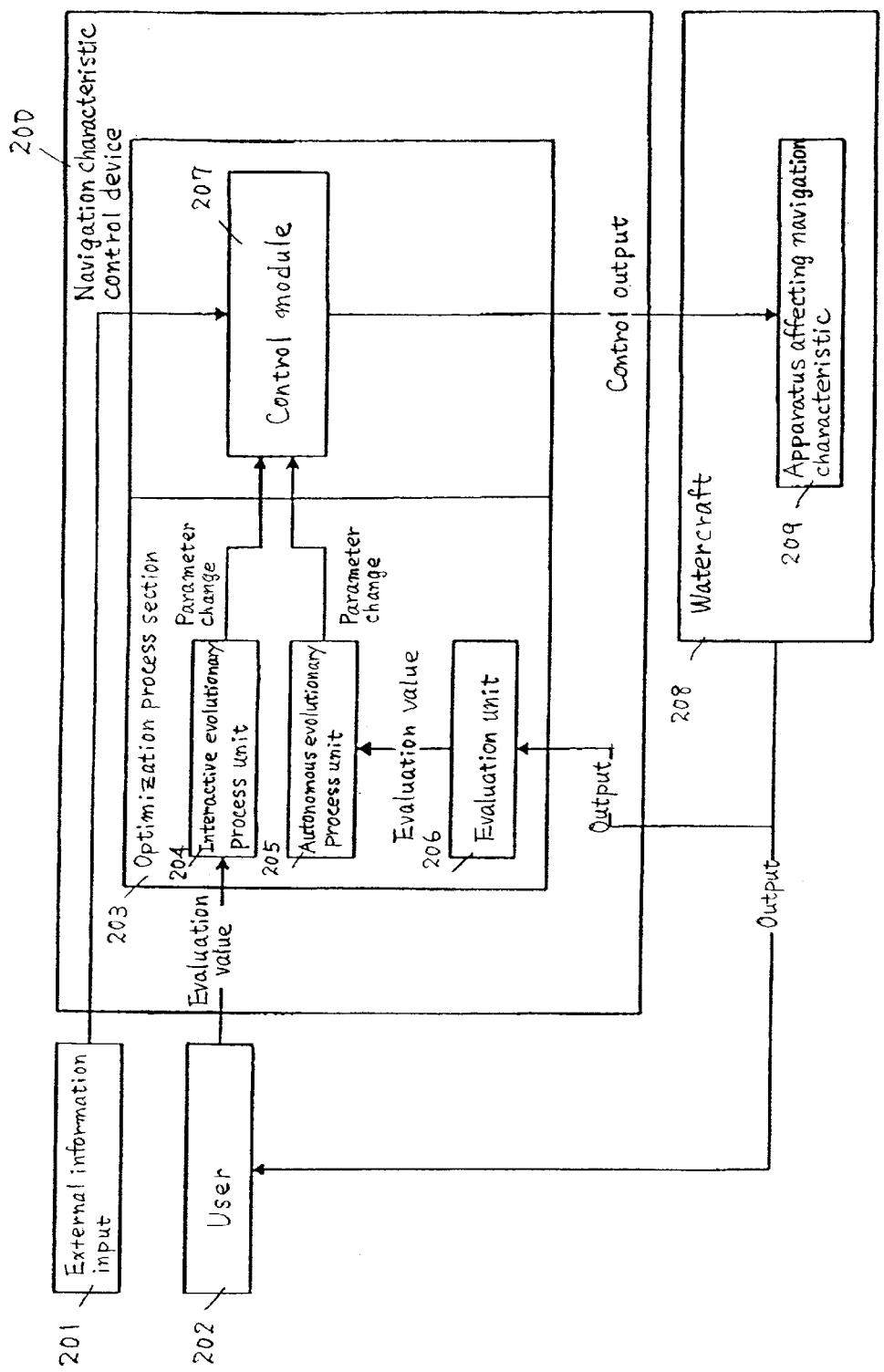
FIG. 2 is a block diagram illustrating one embodiment of a pilot control device in accordance with the invention.

FIG. 2 is a block diagram illustrating one embodiment of a pilot control device in accordance with the invention.

A pilot control device 200 receives external information 201 as input information. The pilot control device 200 includes a control module 207 that, based on the input information, decides and outputs information related to a manipulated variable of an apparatus affecting pilot characteristics 209. The control module 207 is, preferably, the one that employs a fuzzy inference system, for example, a fuzzy controller, fuzzy intention determination system, or fuzzy neurocontroller. But, the control module 207 is not limited to these.

The pilot control device 200 includes an optimization process section 203 that has an interactive evolutionary process unit 204 and an autonomous evolutionary process unit 205. These process units 204 and 205 optimize parameters of the control module 207, in real time, with characteristics of a watercraft as an evaluation subject.

The parameters to be optimized can be any type of parameter as long as they are related to the control module. For example, when a fuzzy inference system is employed, cited as such are the parameters for deciding the number, shape, position and expanse of a membership function, the fuzzy rules, and the standardized coefficients for input and output values.

With regard to evaluation for optimization, the interactive evolutionary process unit 204 receives evaluation values applied by the user 202, and the autonomous evolutionary process unit 205 accepts evaluation values from the evaluation unit 206 which is designed beforehand based on predetermined evaluation criteria.

Thus, by, in real time, optimizing operation characteristics of the device affecting pilot control 209 with the characteristics of the watercraft as an evaluation subject, the characteristics of the watercraft can be fit in real time to user's preference and use environment.

Next, some embodiments where the pilot controlled device in accordance with the invention is applied to a controlled system will be explained below. FIGS. 3–18 show embodiments where the pilot controlled device is applied to an outboard motor and a trimming apparatus for a planing boat.

Figure 3:
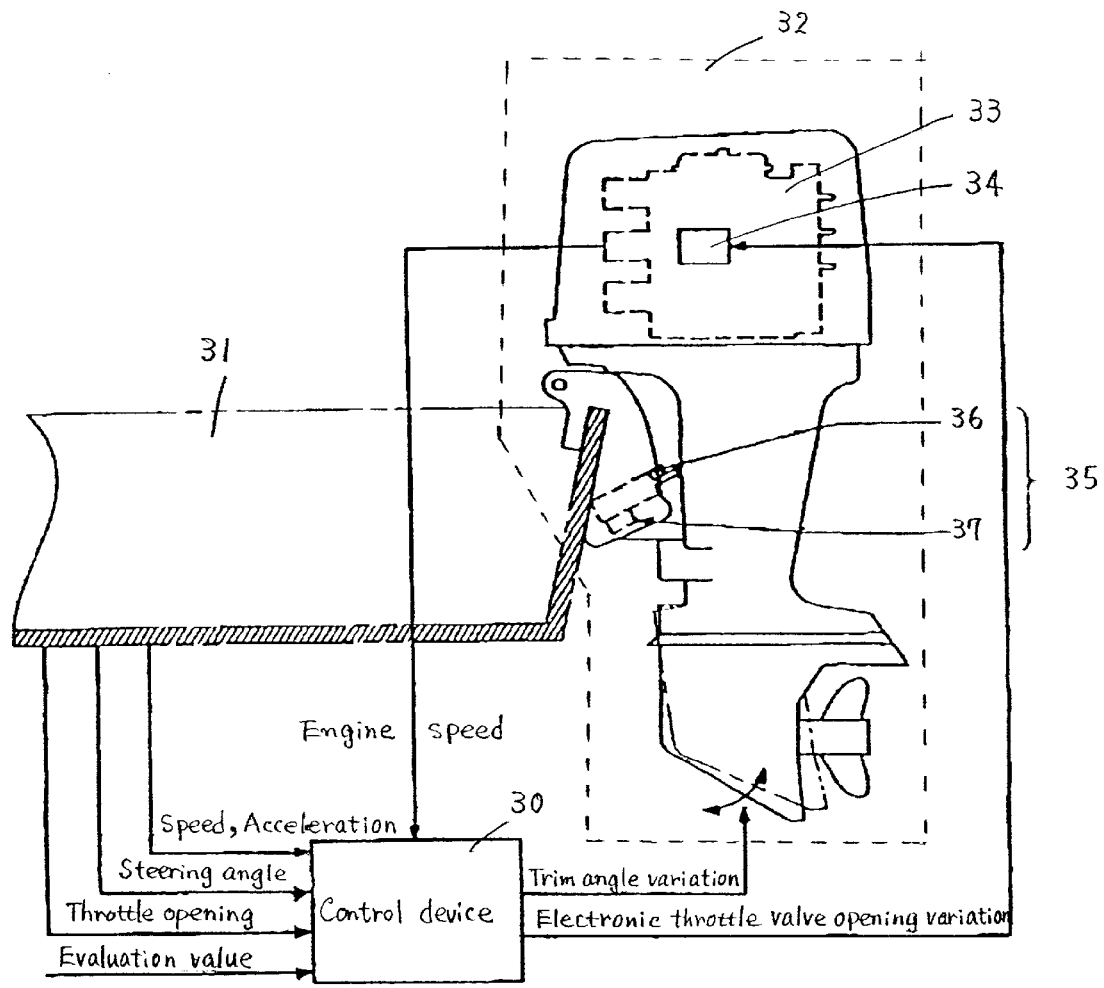
FIG. 3 is a figure illustrating a control device and an outboard motor including a trimming apparatus.

FIG. 3 is a figure illustrating a control device and an outboard motor including a trimming apparatus. An outboard motor 32 is mounted to a hull 31. The outboard motor 32 includes an engine 33 for operating the hull 31 and a trimming apparatus 35 for controlling the cruising direction of the hull 31. The engine 33 has an electronic throttle valve 34 for controlling the speed thereof. The trimming apparatus 35 contains a hydraulic cylinder 36 and a hydraulic pump 37. The outboard motor 32 is connected to an control device 30.

The control device 30 optimizes boat operation characteristics and acceleration characteristics which realize a constant speed pilot control and acceleration optimization control in response to changes in the movement of the hull 31 and disturbances. The control device 30 also optimizes the boat operation characteristics and acceleration characteristics, by responding to preferences of users—when the users are different, or when the preferences of even one and the same user vary dependent on time, for example, when his preferences vary in spring or fall. The "boat operation characteristics" herein mean boat speed control characteristics by the operations of the electronic throttle valve 34 and the trimming apparatus 35.

The control device 30 inputs the engine speed, the speed, acceleration, steering angle, and throttle opening of the hull 31, and the evaluation value. The control device 30 outputs an electronic throttle valve opening variation and a trim angle variation to operate the electronic throttle valve 34 and the trimming apparatus 35, respectively, which controls intake of air and posture of the hull for constant speed pilot control and acceleration optimization control.

Figure 4:
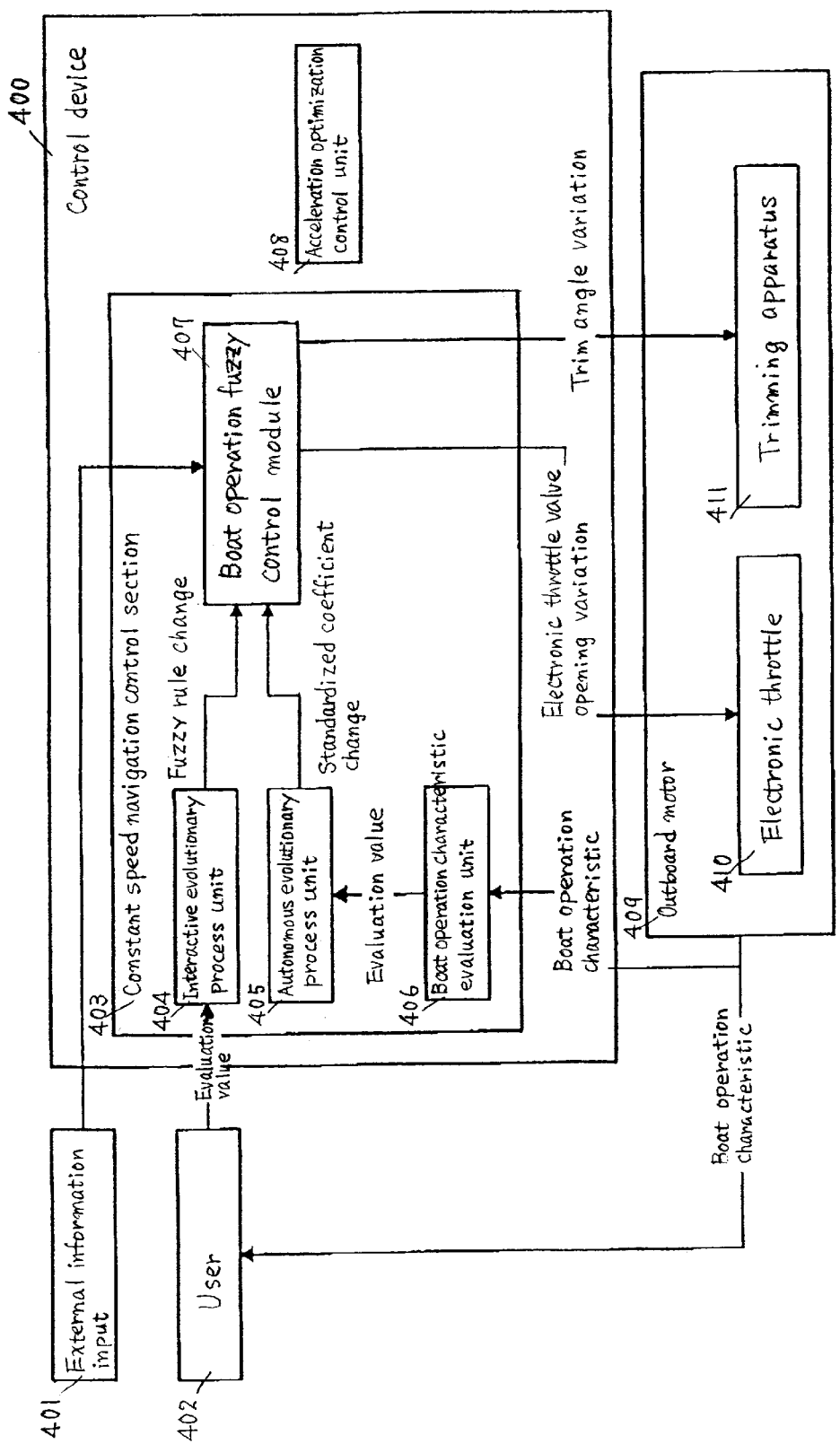
FIG. 4 is a block diagram illustrating an inner structure of a control device.

FIG. 4 is a block diagram illustrating an inner structure of a control device 400. The control device 400 includes a constant speed pilot control section 403, and an acceleration optimization control unit 408. The constant pilot control section 403 has a boat operation fuzzy control module 407, an autonomous evolutionary process unit 405, a boat-operation characteristic evaluation unit 406, and an interactive evolutionary process unit 404. The boat operation fuzzy control module 407 determines an opening of an electronic throttle valve for an electronic throttle 410 and a trim angle for a trimming apparatus 411 in response to predetermined input information. The autonomous evolutionary process unit 405 optimizes standardized coefficients of the boat operation fuzzy control module 407. The boat-operation characteristic evaluation unit 406 evaluates the autonomous evolutionary process unit 405. The interactive evolutionary process unit 404 optimizes the fuzzy rules of the boat operation fuzzy control module 407.

Figure 5:
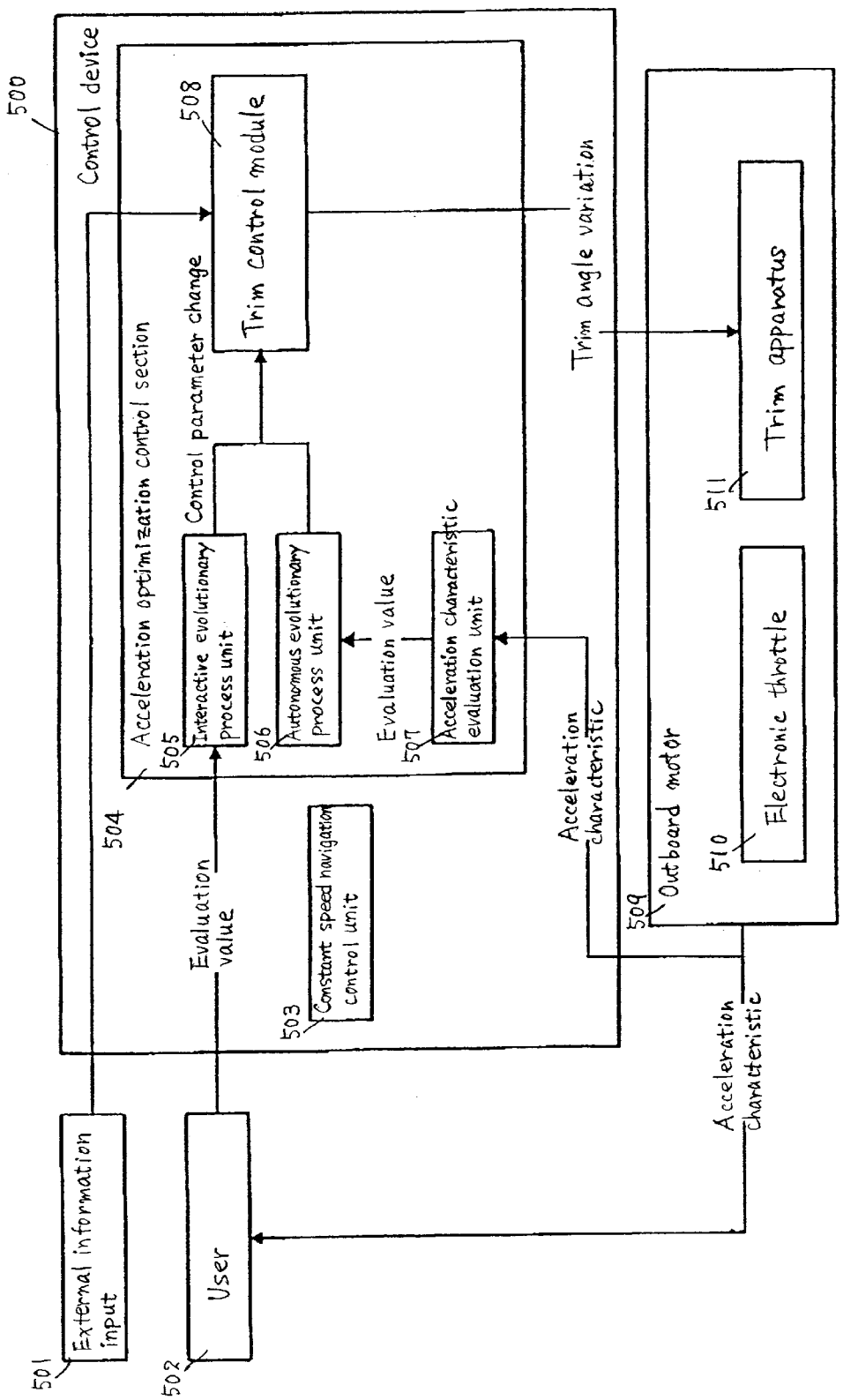
FIG. 5 is a block diagram illustrating an inner structure of a control device.

FIG. 5 is a block diagram illustrating an inner structure of a control device 500. An acceleration optimization control unit 504 includes a trim control module 508, an autonomous evolutionary process unit 506, an acceleration characteristic evaluation unit 507, and an interactive evolutionary process unit 505. The trim control module 508 determines a trim angle for a trim apparatus 511 in response to predetermined input information. The autonomous evolutionary process unit 506 optimizes control parameters of the trim control module 508. The acceleration characteristic evaluation unit 507 evaluates the autonomous evolutionary process unit 506. The interactive evolutionary process unit 505 optimizes control parameters of the trim control module 508.

The "standardized coefficients" mean coefficients that adjust amount of input and output information.

1. Control by a Constant Speed Pilot Control Unit

The boat operation fuzzy control module employs a simplified inference method as a fuzzy inference system, and outputs an electronic throttle valve opening variation and a trim angle variation in response to the engine speed, speed, acceleration, and steering angle. A fuzzy rule table can be designed based on the boat operation knowledge of the skilled. The fuzzy rule is expressed by real number values.

Figure 6:
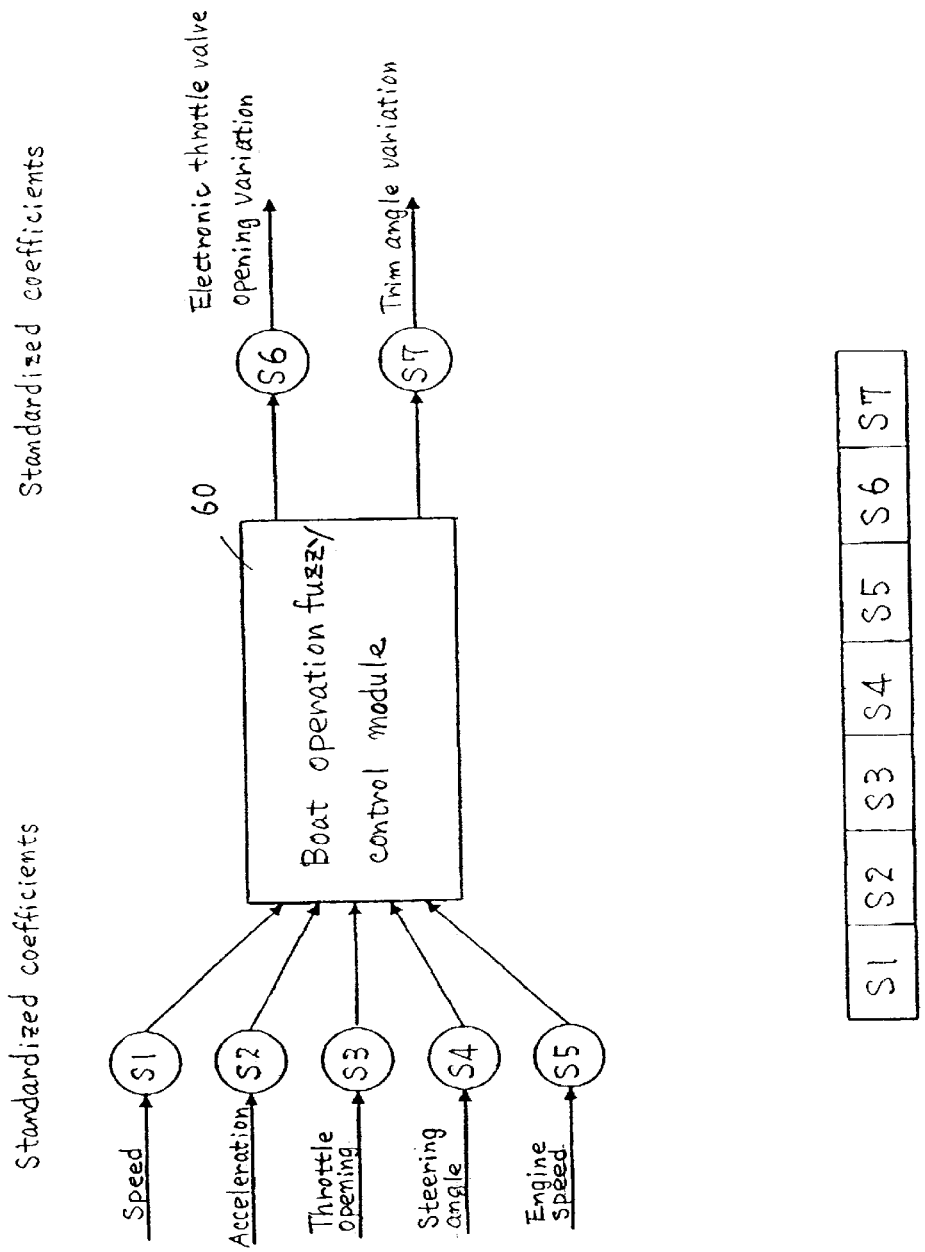
FIG. 6 illustrates relationship between standardized coefficients of a boat operation fuzzy control module and individuals produced by encoding them.

FIG. 6 illustrates relationship between standardized coefficients of a boat operation fuzzy control module 60 and individuals produced by encoding them. The speed is applied to standard coefficient S1; the acceleration, S2; the throttle opening, S3; the steering angle, S4; and the engine speed, S5. Each of the information is applied to the boat operation fuzzy control module 60 through its corresponding standard coefficient. The boat-operation fuzzy control module 60 outputs the electronic throttle valve opening variation and the trim angle variation through the corresponding standard coefficient S6 and S7, respectively.

The autonomous evolutionary process unit in the constant speed pilot control unit uses a genetic algorithm, and encodes the standardized coefficients of the boat operation fuzzy control module 60 as shown in FIG. 6 to produce individuals. The autonomous evolutionary process unit optimizes the standardized coefficients by using the genetic algorithm. With regard to evaluation of each individual during autonomous evolutionary process, regarding boat operating characteristics, higher evaluation values are provided by the evaluation unit as an error between an actual speed and a reference a user has fixed gets closer to a desired range. As a result, the standardized coefficients of the boat operation fuzzy control module 60 are automatically optimized towards the desired boat operating characteristics, and an optimal boat operating characteristic is obtained even when the use environment changes or the hull moves inappropriately.

Thus, the method, by which the evaluation in evolutionary process is made by the evaluation unit designed beforehand and the optimization is automatically performed, is called autonomous evaluation herein.

FIG. 7 illustrates relationship between a fuzzy rule table of the boat operation fuzzy control module and individuals produced by encoding part of it. The autonomous evolutionary process unit uses a genetic algorithm, by which part of the fuzzy rule table for the boat operation fuzzy control module is encoded to produce the individuals, and optimizes the part of the fuzzy rule table using the genetic algorithm. The evaluation of each of the individuals during interactive optimum process is done based on the comfortableness of the ride the user experiences. As a result, the part of the fuzzy rule table is optimized based on the evaluation of the user to produce an optimal boat operating characteristic suitable for the user's evaluation.

The method the user employs regarding the evaluation in evolutionary process is called interactive evaluation herein. The evolutionary process in the constant-speed pilot control unit will be explained below.

Figure 8:
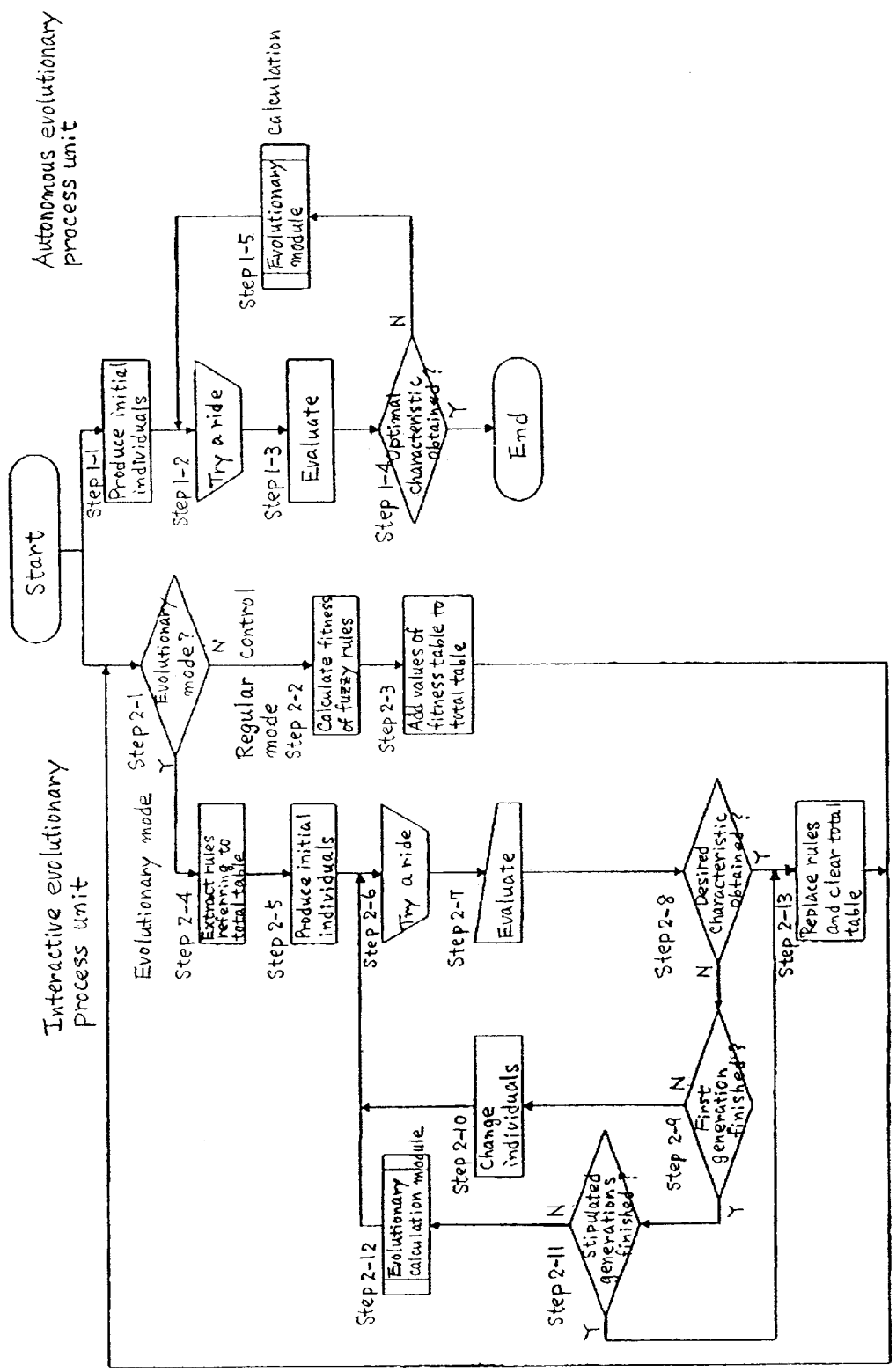
FIG. 8 is a flowchart illustrating evolutionary process by a constant-speed pilot control unit.

FIG. 8 is a flowchart illustrating evolutionary process by a constant-speed pilot control unit. The constant speed pilot control unit, in doing evolutionary process, performs an autonomous evaluation by the autonomous evolutionary process unit and an interactive evaluation by the interactive evolutionary process unit.

When evaluation methods are different, the flows of optimal process will be different. Accordingly, an evolutionary process adopting an autonomous evaluation method and an evolutionary process employing an interactive autonomous evaluation method are explained individually.

a. Evolutionary Process in an Autonomous Evolutionary Process Unit

As shown in FIG. 8, initial values of the standardized coefficients are determined at random within a range decided beforehand to produce first generation comprising a plurality of initial individuals (step 1—1). A constant speed pilot evaluation on all the individuals in the first generation is performed (step 1–2). The constant speed pilot evaluation is explained here. A plurality of individuals is operated in parallel by time division and evaluation values are compared by a total of the duration. To be specific, evaluation is changed according to a range of engine speed used.

Figure 9:
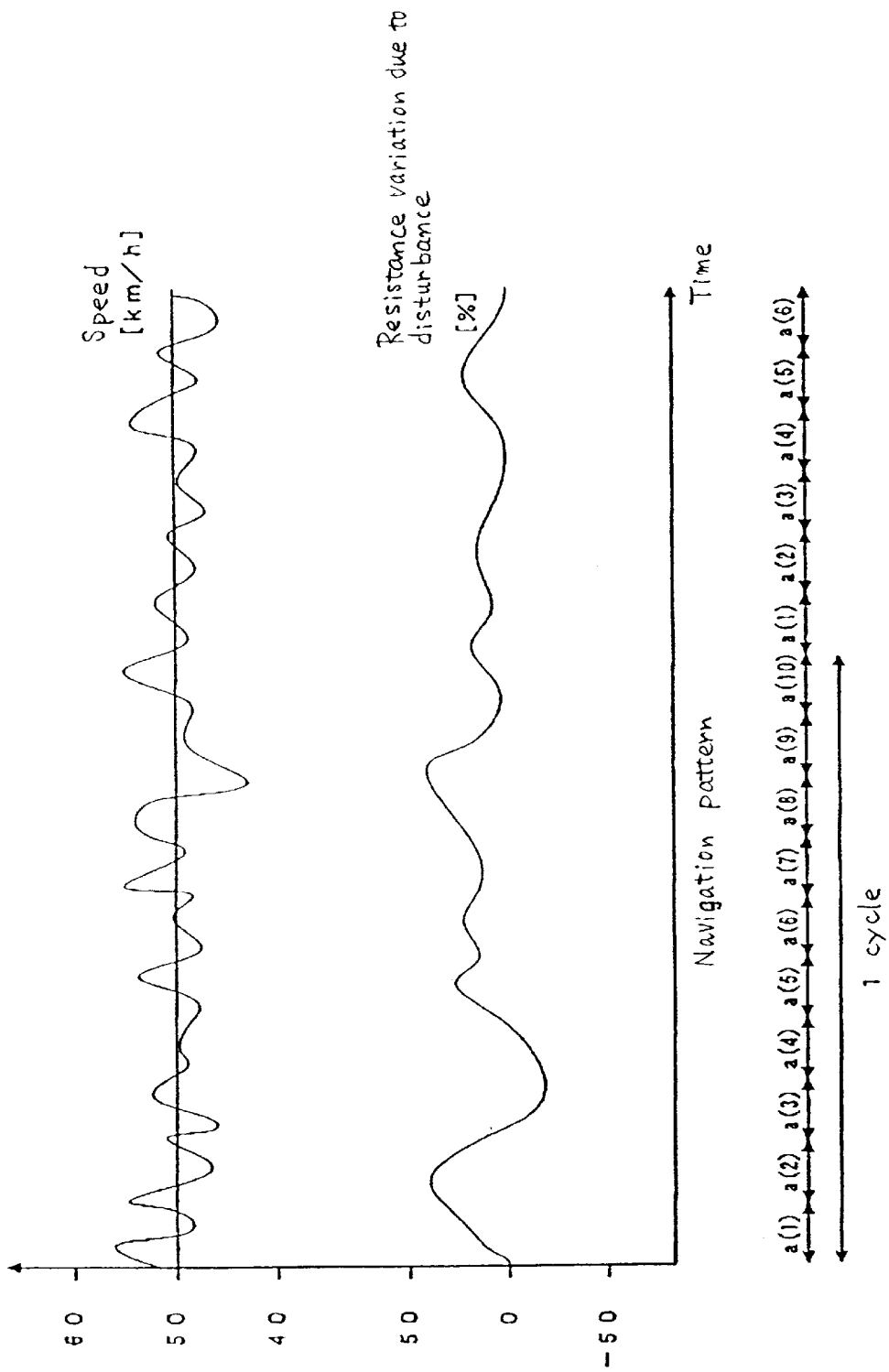
FIG. 9 is a graph illustrating one example of performing time division when a plurality of individuals is evaluated by time-division.

FIG. 9 is a graph illustrating one example of performing time division when a plurality of individuals is evaluated by time-division. As shown in the figure, in the case of trolling where a low speed of an engine is used, ten individuals are controlled every minute, and absolute values of the difference between a reference and an actual speed are totaled every sampling time. Making this one cycle, twenty cycles are repeated to calculate a total within an evaluation period as an evaluation value. By doing so, since influence by disturbances such as atmospheric phenomena and oceanic phenomena (for example, wind, or wave) is understood as a total through the individuals, a fair evaluation of characteristics of each individual can be made.

In the case of cruising where a high speed of an engine is used, unstable movements are produced such as pitching that moves a hull upward or downward and Dutch roll that moves a hull in leftward or rightward. When pitching or Dutch roll is detected, zero is given as an individual evaluation value and a trim angle is reduced till pitching or Dutch roll is prevented from producing, which leads to the hull being stable. The trim angle at that time is called a maximum trim angle. Each individual is evaluated based on the maximum trim angle, which can prevent unstable movements from generating at a high speed.

Based on the evaluation value of each individual derived by the evaluation value calculation process (step 1–2), it is evaluated whether the evaluation value is an optimal boat operation characteristic (step 1–3). As a result of the evaluation, it is decided whether an optimal boat operation characteristic is obtained (step 1–4). If the optimal boat operation characteristic is obtained, the evolutionary process is finished. If not, the process proceeds to an evolutionary calculation module to generate individuals of the next generation (step 1–5).

b. Evolutionary Process in an Interactive Evolutionary Process Unit

Figure 10:
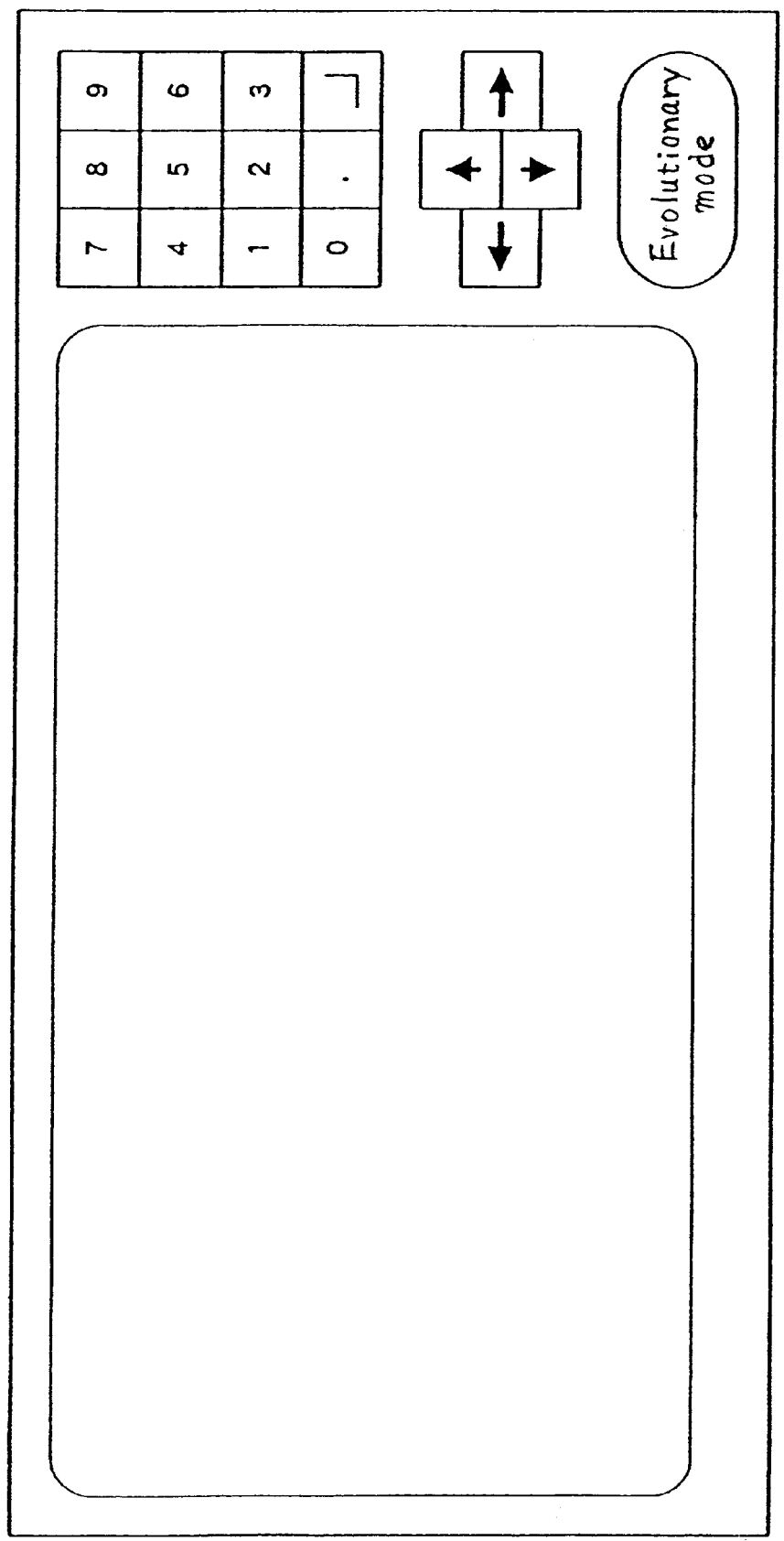
FIG. 10 illustrates one example of an interface for switching between regular control mode and evolutionary mode.

FIG. 10 illustrates one example of an interface for switching between regular control mode and evolutionary mode. As shown in FIG. 8, the interactive evolutionary process unit has two modes: a regular control mode and an evolutionary mode. The switching (step 2–1) between the regular control mode and the evolutionary mode is made in accordance with the conditions fixed beforehand, for example, time or user's intention through an interface shown in FIG. 10.

FIG. 11 illustrates one example of seeking a total of fitness of fuzzy rules. The regular control mode performs fuzzy control using a fuzzy rule table established at the time, and at the same time seeks a total of fitness of the fuzzy rules till evolutionary mode is switched on (step 2—2). To be specific, as shown in FIG. 11, calculation results of the fitness table for calculating the fitness of each fuzzy rule at a certain time are added to the total table for calculating a total of fitness till the evolutionary mode is switched on (step 2–3). The regular control mode is terminated at the time the evolutionary mode is switched to.

When the evolutionary mode is switched to, as shown in FIG. 8, referring to the total table, an arbitrary number of fuzzy rules are encoded into chromosomes in the order of higher total (step 2–4). Regarding these as initials, perturbation is added following a normal distribution to produce a first generation comprising a plurality of initial individuals (step 2–5). A trial ride is made using parameters for any individual in the first generation (step 2–6). The user inputs an evaluation value for the individual (step 2–7).

Based on the evaluation value, it is decided whether a desired boat operation characteristic is obtained (step 2–8). If it is, the individual is regarded as best and the evolutionary process is terminated. If it is not, it is decided whether a trial ride and an evaluation about all the individuals in the first generation are finished (step 2–9). If the trial ride and the evaluation about all the individuals are not finished, the fuzzy rules of the fuzzy control module are changed to those of other individuals (step 2–10) and a ride is tried once again (step 2–6). If they are, it is judged whether a stipulated generation is reached (step 2–11). If it is judged so, the individual with the highest evaluation value in the generation is considered to be best and the evolutionary process is ended. If it is not judged so, the evolutionary calculation module begins (step 2–12) to produce individuals to the next generation and make a trial ride and an evaluation using the fuzzy rules for the individuals.

The above process, by which the desired boat operation characteristics are obtained, is repeated till the number of stipulated generations is reached. As a result, a part of the fuzzy rule table for the boat operation fuzzy control module is replaced by the fuzzy rules for the individuals obtained, and the total table is initialized to zero (step 2–13).

Then, when the regular control mode is switched on again, the fuzzy control is performed by using the replaced fuzzy rule table, and a total of fitness for each fuzzy rule at this time is sought till the evolutionary mode is switched on.

Repeating the above process enables the fuzzy rules with a higher total of fitness, i.e., the fuzzy rules in the region frequently used in the present environment, to be optimized in concentration. Since a fuzzy rule in the region not frequently used does not need to be changed, stable control can be achieved even when the environment changes suddenly and fuzzy rules in the region not frequently used are used.

2. Control in Acceleration Optimization Control Section

The trim control module outputs a trim variable with respect to speed.

Figures 12, 13:
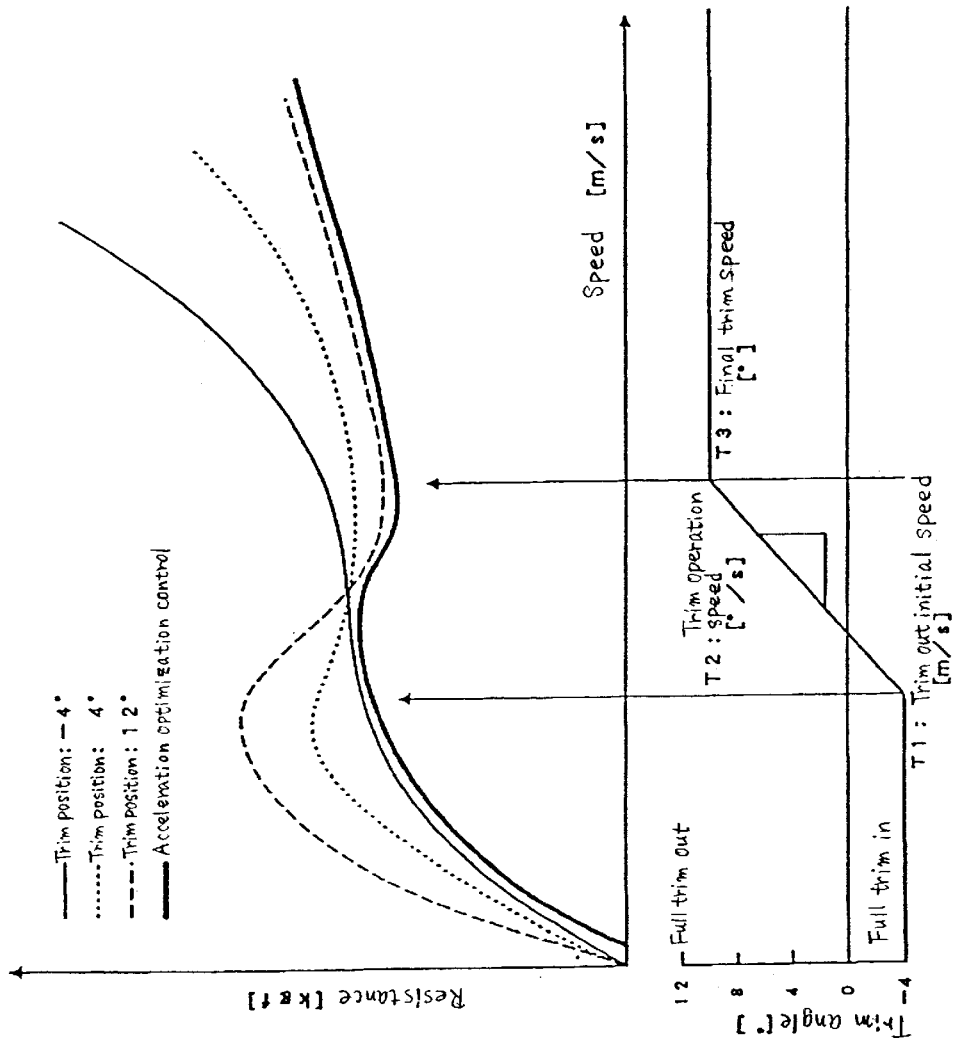
FIG. 12 is a graph showing the relationship between boat speed-resistance curve and trim positions.
FIG. 13 shows one example of individuals used in an autonomous evolutionary process unit in an acceleration optimization control section.

FIG. 12 is a graph showing the relationship between boat speed-resistance curves and trim positions. As shown in the figure, the boat speed-resistance curve depends heavily on the trim positions. The resistance produced between water surface and a hull may be categorized into wave making resistance and friction resistance. The wave making resistance is the one derived from waves generated by a boat itself when the boat moves forward. The friction resistance is the one derived from friction between a hull and water surface.

In a low speed region, the wave making resistance increases in accordance with a higher speed, and at a certain speed, reaches a limit, whose condition is called bump. The bump is smallest when the trim angle is at full trim in where the trim angle is smallest, and becomes bigger as the trim angle gets closer to full trim out where the trim angle is largest.

Beyond the bump, the wave making resistance gradually becomes smaller to a planing state. The friction resistance at the time of the planing is largest at full trim in and is smallest near full trim out.

In accelerating manually from the state of stop to the highest speed, a throttle is fully opened from the state of the full trim in, and after the hump, the trim is gradually operated outward till the trim angle where pitching and Dutch roll are not produced. By doing this, the wave making and friction resistances can be suppressed. As a result, time from stop of a boat to the highest speed is shortened. However, timing for operating a trim, an operating speed and a final trim angle vary greatly depending on kinds of hulls and disturbances, and requires an advanced operation technique.

FIG. 13 shows one example of individuals used in an autonomous evolutionary process unit in an acceleration optimization control section. In the figure, control parameters for a trim control module—trim out initial speed T1, trim operation speed T2, and final trim angle T3—are shown. The autonomous evolutionary process unit employs a genetic algorithm. The control parameters are encoded to produce individuals and are optimized using the genetic algorithm. Evaluation of each individual during the autonomous evolutionary process is conducted by an evaluation unit, where an evaluation value is higher as a desired acceleration characteristic, for example, time from a stop of a boat to a predetermined speed becomes shorter. Accordingly, the control parameters of the trim control module are automatically optimized to the desired acceleration characteristic. Even when a use environment or a hull changes, an optimum acceleration characteristic can be obtained.

The interactive evolutionary process unit in the acceleration optimization control section employs a genetic algorithm. Control parameters for a trim control module are coded to produce individuals and are optimized using the genetic algorithm. Evaluation of each individual during interactive optimization process is conducted based on comfortableness a user really feels. As a result, the control parameters are optimized in accordance with the user's evaluation and an optimum acceleration characteristic that meets user's evaluation can be obtained.

Switching over between the autonomous evolutionary process unit and the interactive evolutionary process unit can be based on time or user's intention through the interface shown in FIG. 10. To be specific, The autonomous evolutionary process unit performs evolutionary process where an optimum acceleration characteristic is produced. Based on the optimum acceleration characteristic, the interactive evolutionary process unit conducts interactive evolutionary process and a fine adjustment may be made to meet a user's preference. When an individual a user does not like is produced during the autonomous evolutionary process, the user may give a zero evaluation value at the scene to change to the next individual.

Next, the evolutionary process in the acceleration optimization control section will be explained.

Figure 14:
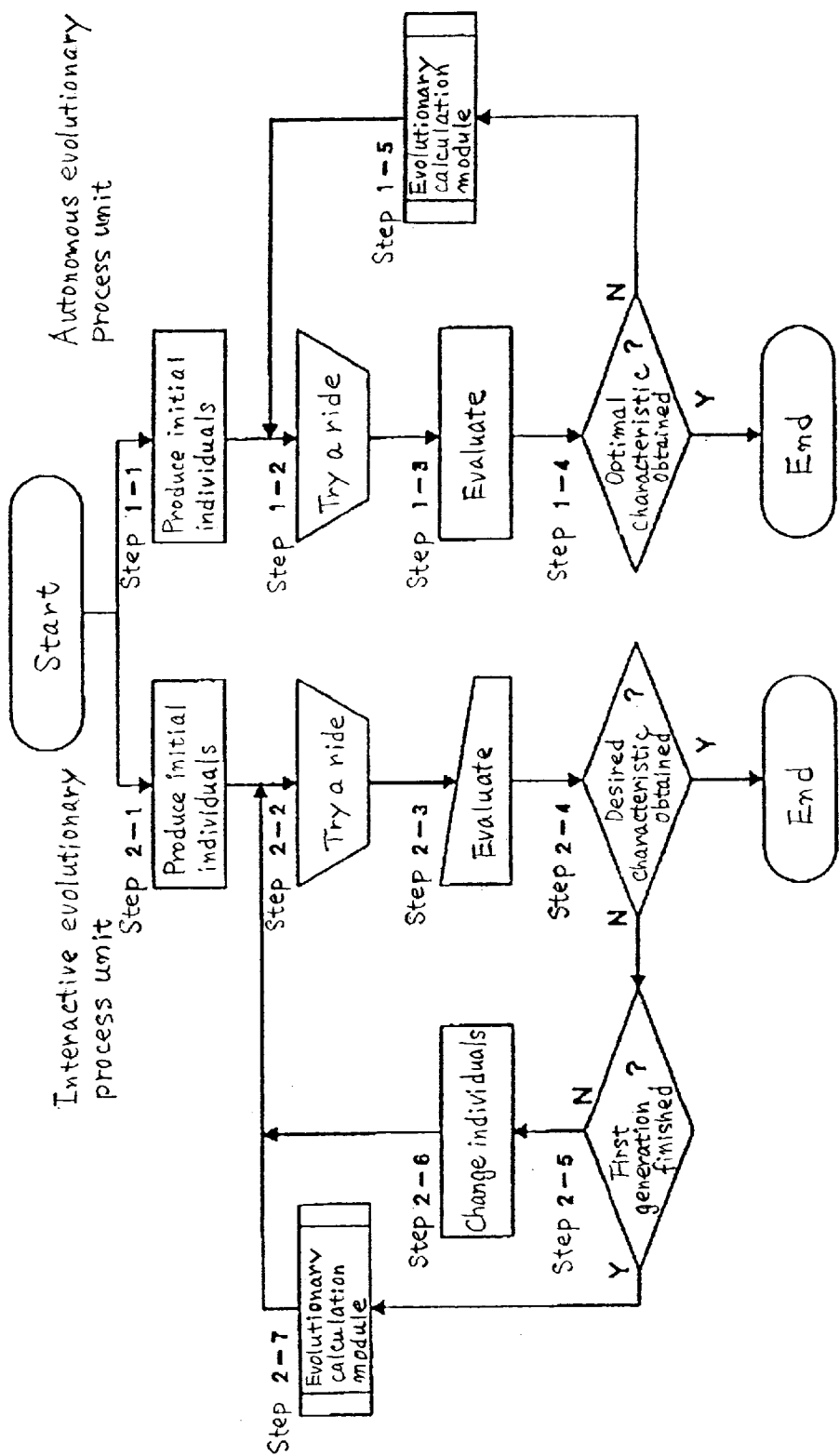
FIG. 14 is a flowchart illustrating evolutionary flow in an acceleration optimization control section.

FIG. 14 is a flowchart illustrating evolutionary flow in an acceleration optimization control section.

a. Evolutionary Process in an Autonomous Evolutionary Process Unit

As shown in FIG. 14, initial values of the control parameters are first decided at random within a predetermined range to produce a first generation from a plurality of initial individuals (step 1—1). Acceleration optimization control evaluation is made on all the individuals in the first generation (step 1–2). The Acceleration optimization control evaluation is explained briefly here. A throttle is accelerated fully open, one time per one individual, from stop of a boat to a predetermined speed. Time needed to reach the predetermined speed is calculated as an evaluation value.

Based on the evaluation value for each individual derived from the evaluation value calculation process (step 1–2), it is evaluated whether it is an optimal acceleration characteristic (step 1–3). As a result of the evaluation, it is determined whether an optimal acceleration characteristic is obtained (step 1–4). If an optimal boat operation characteristic is obtained, the evolutionary process is finished. If not, an evolutionary calculation module begins to produce a next generation of individuals (step 1–5).

b. Evolutionary Process in an Interactive Evolutionary Process Unit

As shown in FIG. 14, initial values of the control parameters are first decided at random within a predetermined range to produce a first generation from a plurality of initial individuals (step 2–1). A trial ride is made by using parameters for any one of individual parameters in a first generation (step 2—2). A user inputs evaluation values on the individual (step 2–3). Based on the evaluation values, it is decided whether a desired acceleration characteristic is obtained (step 2–4). If it is, the evolutionary process is finished. If it is not, it is decided whether a trial ride and evaluation on all the individuals of one generation are over (step 2–5). If it is not, the parameters for the trim control module are changed to those for another individual (step 2–6), and another trial ride is done (step 2–2). If, on the contrary, it is, the evolutionary calculation module begins (step 2–7) to produce an individual group of the next generation. Once again, another trial ride and evaluation using parameters of the individuals are conducted.

The process is repeated till a desired acceleration characteristic is obtained, and as a result the parameters of the trim control module are optimized.

An evaluation of acceleration characteristics, which uses an interactive type, is explained here. After acceleration is increased from a stop of a boat to a predetermined speed with a throttle fully open, one time per individual, an evaluation value is input based on the acceleration and comfortableness a user feels.

Now, some of evolutionary computation modules will be exemplified.

a. Genetic Algorithm (GA)

Figure 15:
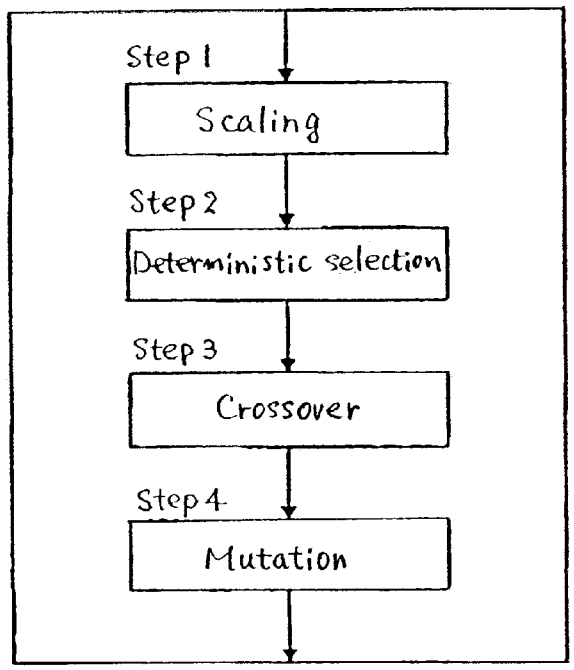
FIG. 15 is a flowchart illustrating an evolutionary computation module when generic algorithm is used as an evolutionary computation method.

FIG. 15 is a flowchart illustrating an evolutionary computation module when a generic algorithm is used as an evolutionary computation method. In the module, when a desired characteristic is not obtained after completion of an evaluation of all the individuals to one generation, a group of individuals to the next generation is produced.

With respect to scaling (step 1), a linear transformation of fitness is performed so that the ratio of an average fitness to a maximum fitness in a individual group may be constant.

As for selection (step 2), a roulette selection system can be adopted that selects stochastically in proportional to user's evaluation (fitness). A tournament selection system can also be employed that selects one with the best evaluation in the N individuals selected at random.

Regarding crossover (step 3), there are methods such as one-point crossover, two-point crossover, and normal-distribution crossover. It happens that a selected parent for crossover is the same individual. When this situation is left as is, diversity as an individual group is lost. Therefore, if a parent selected for crossover is the same individual, the crossover for the same individual should be avoided as much as possible by replacing the individual with another selected individual.

As for mutation (step 4), values are changed at random with a constant probability about each locus for individuals. There is also another method by which perturbation having a normal distribution can be added. In the case where different individuals are selected as parents for crossover and the different individuals are genetically the same, mutation takes place with higher probability than usual for both of the parents to be crossed over.

In addition to that mentioned above, a method of the alternation of generations called "regeneration," which replaces all the individuals to one generation one time, may be employed.

When the alternation of generations is applied strictly, there is a possibility that an individual with high evaluation may be destroyed. Accordingly, elite preservation strategy can be used together that unconditionally leaves the elite (any number of individuals that have acquired high evaluation) to the next generation.

b. Evolutionary Strategy (ES)

Figure 16:
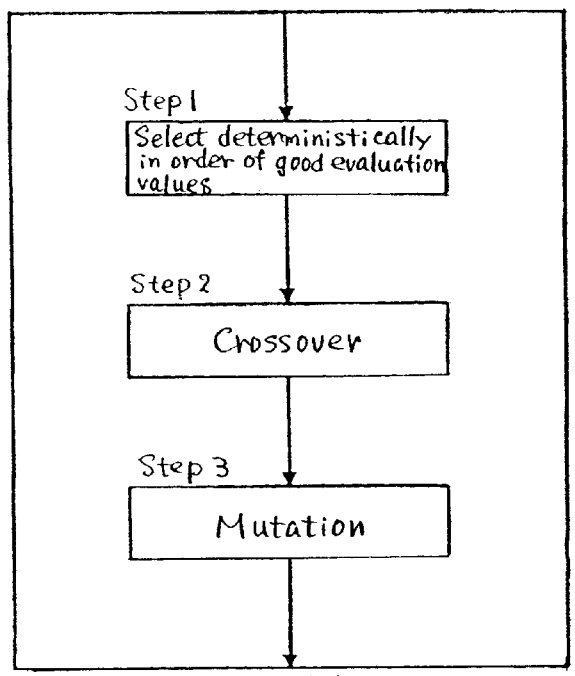
FIG. 16 is a flowchart illustrating an evolutionary computation module when evolutionary strategy is used as an evolutionary computation method.

FIG. 16 is a flowchart illustrating an evolutionary computation module when evolutionary strategy is used as an evolutionary computation method. The module produces an individual group for the next generation, after completing an evaluation of all the individuals to one generation, when a desired characteristic is not obtained.

As for selection (step 1), two exemplary kinds of methods are explained since methods of selection are different owing to the kinds of evolutionary strategy.

($\mu$, $\lambda$)—ES: This evolutionary strategy deterministically selects $\mu$ individuals in the order of better fitness from $\lambda$ child individuals produced by $\mu$ parent individuals.

($\mu+\lambda$)—ES: This evolutionary strategy deterministically selects $\mu$ individuals in the order of better fitness from $\mu$ parent individuals and $\lambda$ child individuals combined.

In addition to the methods mentioned above, the evolutionary strategy includes other methods below. When these methods are used, a selection suitable for the methods should be made.

(1, 1)—ES: Random Walk (RW)
(1+1)—ES: Hill Climbing (HC)
(1, $\lambda$)—ES, (1+$\lambda$)—ES: Adjacent search method
($\mu+1$)—ES: Successive generation multi-point search method Regarding crossover (step 2), the normal distribution is used. Parents' values can be succeeded for each parameter, and child's values can be a middle point, interpolated point or extrapolated point.

With respect to mutation (step 3), perturbation having a normal distribution is added to each parameter. The dispersion of the normal distribution may be adjusted every parameter or may have interrelationship between the parameters.

Since the evolutionary strategy (ES), as explained above, uses each parameter as a real number, it has the advantage that a transformation from phenotype to genotype is no longer necessary. Using a method of crossover having continuity of real numbers such as normal distribution crossover enables parents' character to be reflected more heavily to child's character than the binary code frequently used in a genetic algorithm or the gray code crossed over at one point or many points.

c. Evolutionary Programming (EP)

Figure 17:
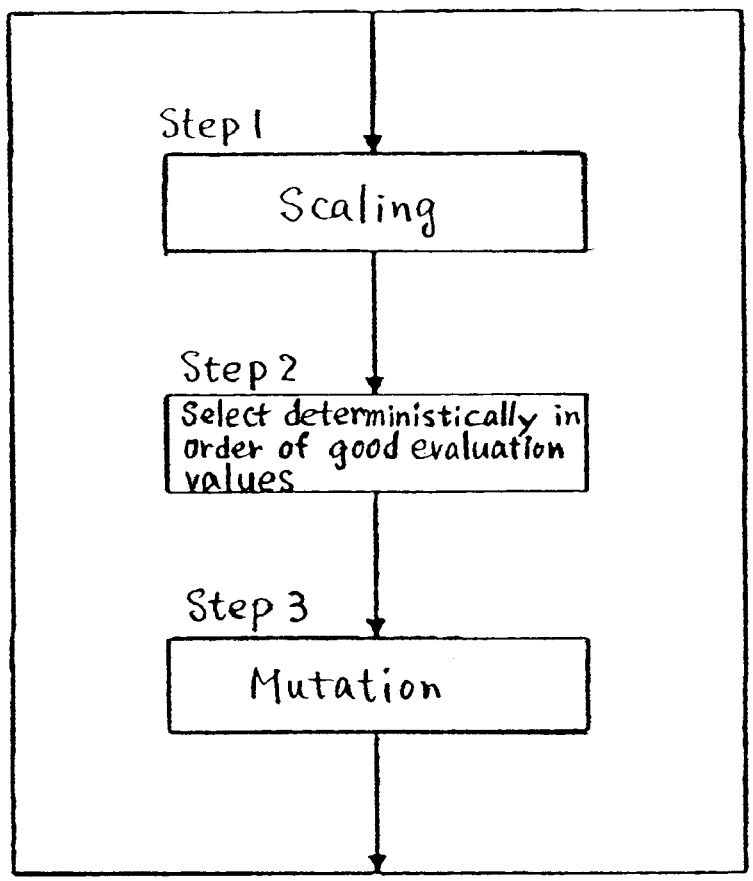
FIG. 17 is a flowchart illustrating an evolutionary computation module when evolutionary programming is used as an evolutionary computation method.

FIG. 17 is a flowchart illustrating an evolutionary computation module when evolutionary programming is used as an evolutionary computation method.

With regard to scaling (step 1), when the number of individuals is $\mu$, the 2 $\mu$ individuals, combined with the individuals before perturbation is added and the individuals after perturbation is added, are compared with the q individuals selected at random. The superior number is defined as fitness of the individuals.

In selection (step 2), $\mu$ individuals are selected in the order of good fitness from individual groups produced. The selection is deterministic, but since scaling is stochastic, the selection is substantially stochastic.

Since the evolutionary programming (EP) mentioned above uses each parameter as a real number, it has the advantage that a transformation from phenotype to genotype is no longer necessary. As no crossover is used, there is no limitation in phenotype. The parameters of the genetic algorithm do not have to be in a string as in the evolutionary strategy, and may be in a tree structure.

The use environment of the planing boat in the embodiments can be varied remarkably owing to the change of weathers or seasons. The preference of users varies significantly. Therefore, it is impossible to acquire boat speed control characteristics that can satisfy all users under every use environment, in a design stage or setting stage before shipment. Since an outboard motor and a hull are manufactured individually, throttle control and trim angle control for the hull are indispensable so as to achieve optimal boat speed control, in addition to the characteristics of use environment and a user. When a fuzzy controller is used as a control device, it is difficult to optimize the characteristics of the fuzzy controller to fit all conditions. However, as described above, the parameters for the boat operation fuzzy control module, which controls an electronic throttle valve and a trim, may be optimized in real time by using the evolutionary calculation. Accordingly, the invention has the distinct advantage that the boat control can be achieved that suits all conditions.

In the embodiments explained above, information concerning engine speed, speed, acceleration, and steering angle is input. Based on the information, by operating an electronic throttle valve and a trim apparatus, intake of air and posture of a hull are controlled to realize constant speed pilot control. The constant speed pilot control unit determines, based on the predetermined input information, an opening of the electronic throttle valve and a trim angle through a boat operation fuzzy control module. The standardized coefficients for the boat operation fuzzy control module are optimized using an autonomous evaluation, and the fuzzy rules for the boat operation fuzzy control module are optimized using an interactive evaluation. By inputting the speed and operating the trim apparatus based on the input information, the posture is controlled that leads to the acceleration control. The acceleration optimization control unit determines the trim angle based on the predetermined input information through the trim control module. The control parameters for the trim control module are optimized using the autonomous and interactive evaluations. These are applied to the pilot control apparatus. The pilot control apparatus in accordance with the invention is not limited to the embodiments mentioned above. For example, the evaluation may be made based on fuel consumption rate and/or power rate, or based on comfortableness a user feels. The acceleration optimization control section may include an electronic throttle control module.

In the embodiments above, an outboard motor for a planing boat and a trim apparatus are optimized. The invention is not restricted to the embodiments.

Figure 18:
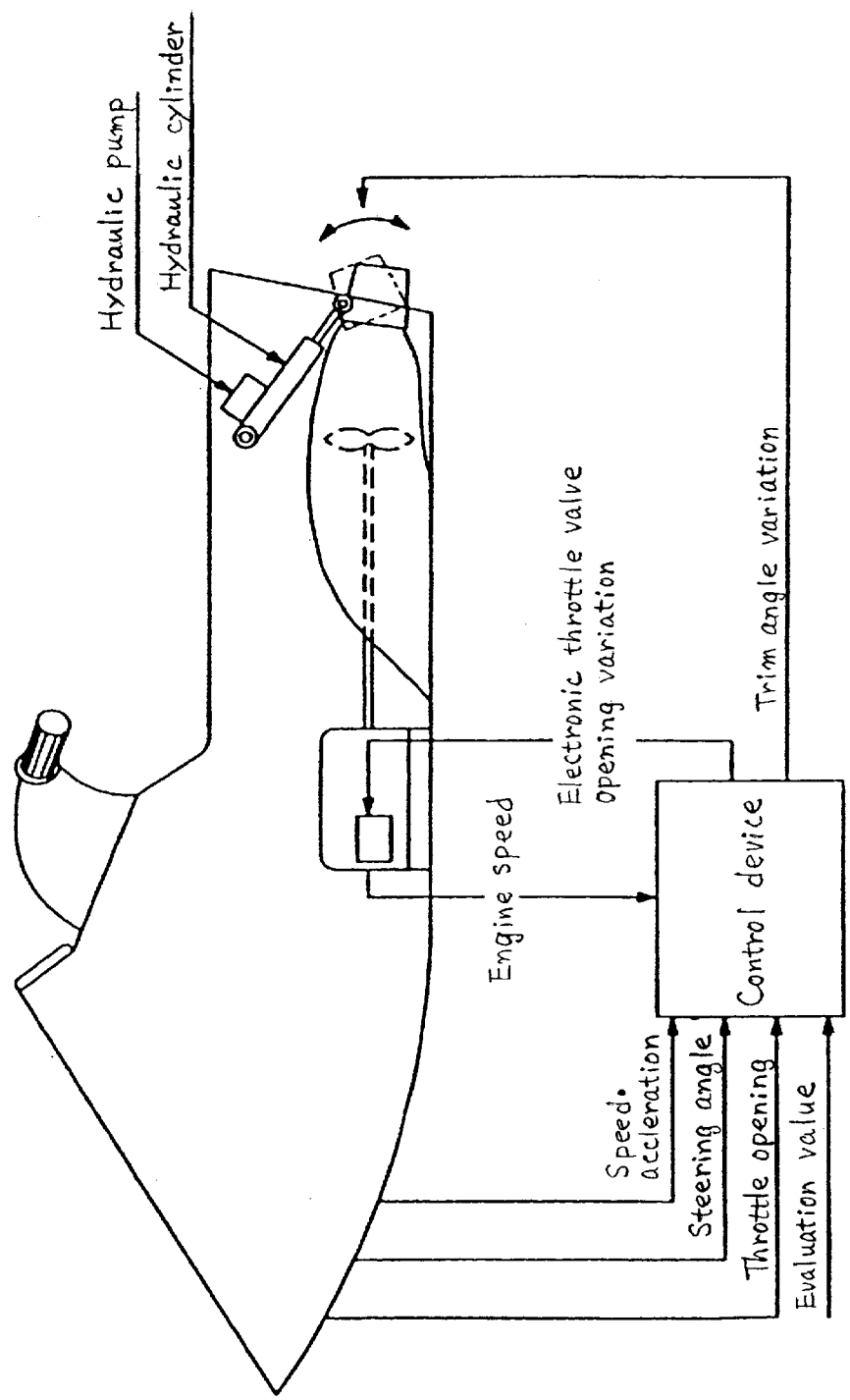
FIG. 18 is another embodiment of the invention.

FIG. 18 is another embodiment of the invention. As shown in the figure, a personal watercraft is used as a finished-product that comprises an engine, a water nozzle apparatus, and a hull. The engine and water nozzle apparatus constitute a unitary apparatus. When the invention is applied, a control device that controls an electronic throttle and a water nozzle trim apparatus in the engine are optimized with the characteristics of the personal water craft as an evaluation criterion. The control of the intake of air and the posture of the hull can be optimized.

Figure 19:
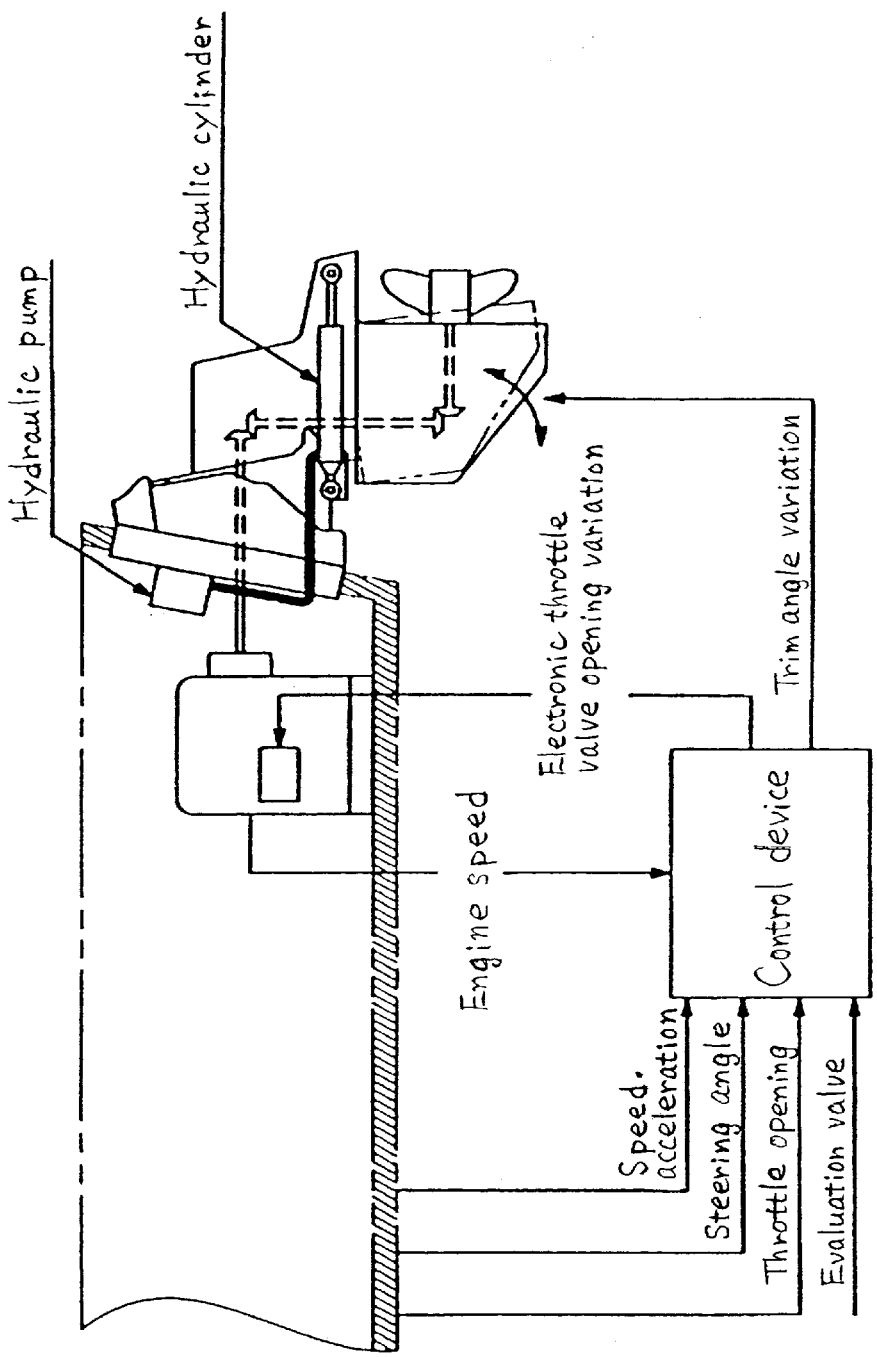
FIG. 19 is a further embodiment of the invention.

FIG. 19 is a further embodiment of the invention. The planing boat is used as a combined finished-product that comprises a hull, an outboard motor and a trim apparatus having a gasoline engine. When the invention is applied with the outboard motor and trim apparatus as a unitary apparatus, the control device that controls an electronic throttle valve apparatus and a trim apparatus in the engine can be optimized with the characteristics of the planing boat as an evaluation criterion. Then control of intake of air and a posture of a hull can also be optimized.

Figure 20:
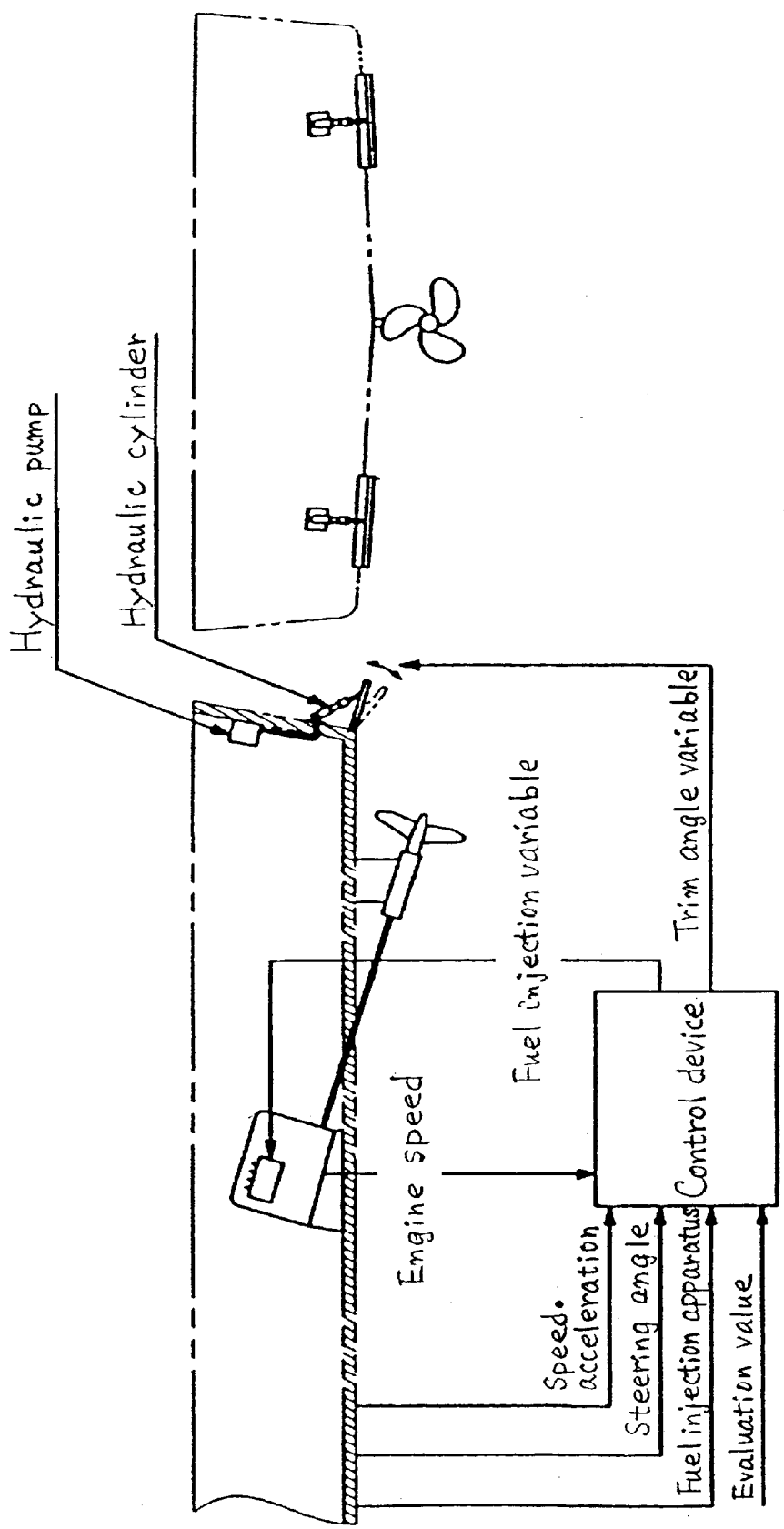
FIG. 20 is a still further embodiment of the invention.

FIG. 20 is a still further application of the invention. The planing boat is used as a combined finished-product that comprises a hull, an outboard motor having a diesel engine and a flap movable apparatus. When the invention is provided by treating the outboard motor and flap movable apparatus as a unitary apparatus, the control device, which controls a fuel injection apparatus in the engine and the flap movable apparatus, are optimized with the characteristics of the planing boat a evaluation criterion. Then the control of quantity of fuel injection and a posture of the hull can be optimized.

The invention provides a pilot control device that includes a control module. The control module determines output regarding a manipulated variable of the device affecting pilot control based on predetermined input information. The pilot control device also includes an optimum process device that optimizes, in real time, the control module, with the characteristics of a watercraft as an evaluation subject. Accordingly, one of the embodiments in accordance with the invention provides the advantage that optimum pilot characteristics can be obtained for users' preference and use environment that are diverse and changeful.

Since an outboard motor, manufactured apart from hulls, is mounted to various kinds of hulls, adaptability to hulls is also required besides that to users' preference and use environment. Although it is extremely difficult to get characteristics satisfying all requirements, one of the embodiments of the invention produces the advantage that the above problem can be solved because the device affecting pilot control is an outboard motor.

Since the optimum process unit evaluates optimum process based on predetermined evaluation standards, one of the embodiments of the invention provides the advantage that no burdens on users can be imposed with respect to the optimum process.

Since the optimization process section includes an input device for inputting evaluations based on user's intention regarding optimization process and performs optimization along the evaluations, user's preference can be reflected for the optimization process. Accordingly, one of the embodiments of the invention provides the advantage that characteristics more suitable for user's preference can be obtained, and that the user can get enjoyment that he himself is participating in the optimization.

What is claimed is:

1. A watercraft pilot control device provided in a watercraft including, as a device affecting pilot control, a propulsion device and a trim apparatus, said watercraft pilot control device comprising:

a control module for determining an output regarding a manipulated variable for the trim apparatus based on predetermined input information, wherein an input-output relationship of the control module is regulated by multiple trim control parameters; and an optimization process device for, in real time, optimizing the control module with a characteristic of the watercraft as an evaluation subject, by optimizing the multiple trim control parameters so as to reduce water resistance when increasing a boat speed.

2. The watercraft pilot control device of claim 1, wherein the propulsion device is a prime mover, and wherein the control module further controls an operation characteristic of the prime mover.

3. The watercraft pilot device of claim 2, wherein the prime mover includes an electronic throttle apparatus and/or an electronic control fuel injection apparatus, and wherein the control module controls an electronic throttle valve opening and/or a fuel injection quantity.

4. The watercraft pilot control device of claim 2, wherein the prime mover generates water flow for propulsion, wherein the trim apparatus is a water nozzle trimming apparatus for changing a direction of the water flow, and wherein the control module controls at least an operation characteristic of the water nozzle trimming apparatus.

5. The watercraft pilot control device of claim 1, wherein the device affecting pilot control includes an outboard motor having a trimming apparatus, and wherein the control module controls an trim angle for the trimming apparatus.

6. The watercraft pilot control device of claim 1, wherein the trim apparatus is a movable flap apparatus, and wherein the control module controls at least an operation characteristic of the flap apparatus.

7. The watercraft pilot control device of claim 1, wherein the control module includes a basic control module that outputs a manipulated variable for the device affecting pilot control based on predetermined input information, and a compensation control module that outputs a compensation quantity or compensation rate with respect to the manipulated variable based on predetermined input information, whereby the optimization process device optimizes control parameters for the compensation control module.

8. The watercraft pilot control device of claim 7, wherein the predetermined input information is at least any one of a speed, acceleration, trim angle, steering angle, throttle manipulated variable, and engine speed of the watercraft.

9. The watercraft pilot control device of claim 1, wherein the optimization process device includes an optimization operation unit for performing operation of an optimization technique, and an autonomous evaluation unit for evaluating optimization process based on a predetermined evaluation criterion.

10. The watercraft pilot control device of claim 1, wherein the optimization process device includes an optimization operation unit for performing operation of an optimization technique, and an input device for inputting evaluation based on user's intention regarding optimization process, whereby optimization is performed along the user's intention.

11. The watercraft pilot control device of claim 1, wherein the evaluation subject includes at least a fuel consumption rate and/or consumed electric power.

12. The watercraft pilot control device of claim 1, wherein the characteristic of the watercraft as the evaluation subject includes at least time spent from a stop to a highest speed and/or follow-up with regard to user's designated speed of the watercraft.

13. The watercraft pilot control device of claim 1, wherein the characteristic of the watercraft as the evaluation subject includes at least comfortableness in the watercraft.

14. The watercraft pilot control device of claim 1, wherein the optimization process device performs optimization operation by using a heuristic.

15. The watercraft pilot control device of claim 14, wherein the heuristic is a evolutionary calculation method.

16. The watercraft pilot control device of claim 1, wherein the multiple trim control parameters are a trim-out initiation speed, a trim operation speed, and a final trim angle.

17. A watercraft pilot control device provided in a watercraft including, as a device affecting pilot control, a propulsion device and an apparatus for trim control, said watercraft pilot control device comprising:

a control module for determining an output regarding a manipulated variable for the device affecting pilot control based on pre-selected input information, said control module having multiple operation modes, wherein an input-output relationship of the control module for each operation mode is regulated by a different set of multiple control parameters; and an optimization process device for optimizing in real time the control module for each operation mode with a characteristic of the watercraft as an evaluation subject, by optimizing the multiple control parameters for each operation mode separately.

18. The watercraft pilot control device of claim 17, wherein the multiple operation modes include a general pilot mode and an acceleration mode.

19. The watercraft pilot control device of claim 18, wherein the control module for the acceleration mode controls the trim apparatus and is regulated by control parameters including a trim-out initiation speed, a trim operation speed, and a final trim angle.

20. The watercraft pilot control device of claim 18, wherein the control module for the general pilot mode controls the trim apparatus and the propulsion device and is provided with a fuzzy inference system.

* * * * *